United States Patent [19]
Kayumi

[11] Patent Number: 5,795,023
[45] Date of Patent: Aug. 18, 1998

[54] HEADREST STORAGE MECHANISM FOR MOTOR VEHICLE SEAT

[75] Inventor: Tetsuya Kayumi, Wako, Japan

[73] Assignee: Honda Giken Kogyo Kabushiki Kaisha, Tokyo, Japan

[21] Appl. No.: 967,096

[22] Filed: Nov. 10, 1997

Related U.S. Application Data

[63] Continuation of Ser. No. 719,838, Sep. 30, 1996, abandoned.

[30] Foreign Application Priority Data

Oct. 6, 1995 [JP] Japan ................... 7-259941

[51] Int. Cl.[6] .................. B60N 2/32; B60N 2/36
[52] U.S. Cl. ............... 297/331; 297/397; 297/336; 296/65.1; 296/69
[58] Field of Search .................. 297/397, 331, 297/335, 336; 296/69, 65.1

[56] References Cited

U.S. PATENT DOCUMENTS

| | | | |
|---|---|---|---|
| 3,265,437 | 8/1966 | Mincieli | 297/378.12 |
| 3,449,012 | 6/1969 | Caron | 297/403 |
| 4,376,552 | 3/1983 | Pilhall | 296/69 |
| 4,475,763 | 10/1984 | Hamatani et al. | 296/65.1 |
| 4,512,609 | 4/1985 | Pärsson | 296/65.1 |
| 5,133,589 | 7/1992 | Kimura | 297/335 |
| 5,558,386 | 9/1996 | Tiiły et al. | 296/65.1 |

FOREIGN PATENT DOCUMENTS 170638  5/1989  Japan.

OTHER PUBLICATIONS

Pertinent Portion of JP 1-70638 in English.

*Primary Examiner*—Peter R. Brown
*Assistant Examiner*—Anthony D. Barfield
*Attorney, Agent, or Firm*—Lyon & Lyon LLP

[57] ABSTRACT

A motor vehicle seat has a seat cushion angularly movable about a pivot, a backrest angularly movable about a shaft, and a headrest detachably mounted on the backrest, the headrest having a pair of stays extending downwardly. A headrest storage mechanism has a headrest storage space defined between the seat cushion and the backrest when the seat cushion is lifted forward and the backrest is lowered forward toward the seat cushion, with the headrest removed from the backrest, and a pair of arms mounted on the seat cushion and attached to the pivot, for supporting the headrest in a given attitude when the seat cushion is lifted forward. The headrest storage space has such dimensions as to be able to store the stays extending downwardly from the headrest when the headrest is supported on the arms.

7 Claims, 5 Drawing Sheets

HEADREST STORAGE MECHANISM FOR MOTOR VEHICLE SEAT

This application is a Continuation Application, of application Ser. No. 08/719,838 filed on Sep. 30, 1996 now abandoned.

BACKGROUND OF THE INVENTION

1. Field of the Invention:

The present invention relates to a headrest storage mechanism for storing a headrest of a motor vehicle seat between a seat cushion which is lifted forward and a backrest which is lowered forward toward the seat cushion.

2. Description of the Related Art:

In some motor vehicles such as automobiles, a wide cargo space may be produced by lifting forward the seat cushion of a passenger's seat and lowering the backrest thereof forward toward the seat cushion, and using the rear surface of the backrest as a cargo support base.

One conventional motor vehicle seat that can be folded to provide a cargo space is disclosed in Japanese laid-open utility model publication No. 1-70638, for example. The disclosed motor vehicle seat will be described below with reference to FIG. 5 of the accompanying drawings. As shown in FIG. 5, a motor vehicle seat 1 comprises a seat cushion 2 pivotally mounted on a vehicle floor, a backrest 3 pivotally mounted on the vehicle floor, and a headrest 4 detachably mounted on an upper edge of the backrest 3. Joints 5, 6 are attached to the lower surface of the seat cushion 2 and the upper edge of the backrest 3, respectively. The joint 6 on the upper edge of the backrest 3 doubles as a stay for the headrest 4 when the headrest 4 is attached to the backrest 3.

After the seat cushion 2 is lifted forward, the backrest 3 is angularly lowered forward toward the seat cushion 2, and the joints 5, 6 on the seat cushion 2 and the backrest 3 are connected to each other. The headrest 4 detached from the backrest 3 is stored in a storage space 7 which is defined between the seat cushion 2 and the backrest 3.

However, since the headrest 4 is mounted on the backrest 3 by the joint 6, the conventional motor vehicle seat is of a rather special structure that cannot be used in general applications, and the headrest 4 mounted on the backrest 3 cannot be adjusted in position. Furthermore, because the headrest 4 which is stored is placed in the storage space 7 between the seat cushion 2 and the backrest 3, the headrest 4 tends to move, producing noise while the motor vehicle is running. The stored headrest 4 is liable to get smeared with dirt as it is placed directly on the floor of the motor vehicle. Specifically, the storage space 7 has no structure for securely holding the headrest 4 which is of a round shape. Consequently, the stored headrest 4 can easily move in the storage space 7, making much noise and tending to get smeared with much dirt.

SUMMARY OF THE INVENTION

It is a major object of the present invention to provide a headrest storage mechanism for a motor vehicle seat, which can easily and reliably hold a headrest, and has a simple structure for effectively preventing the headrest from moving about, making noise, and getting smeared with dirt.

The above and other objects, features, and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
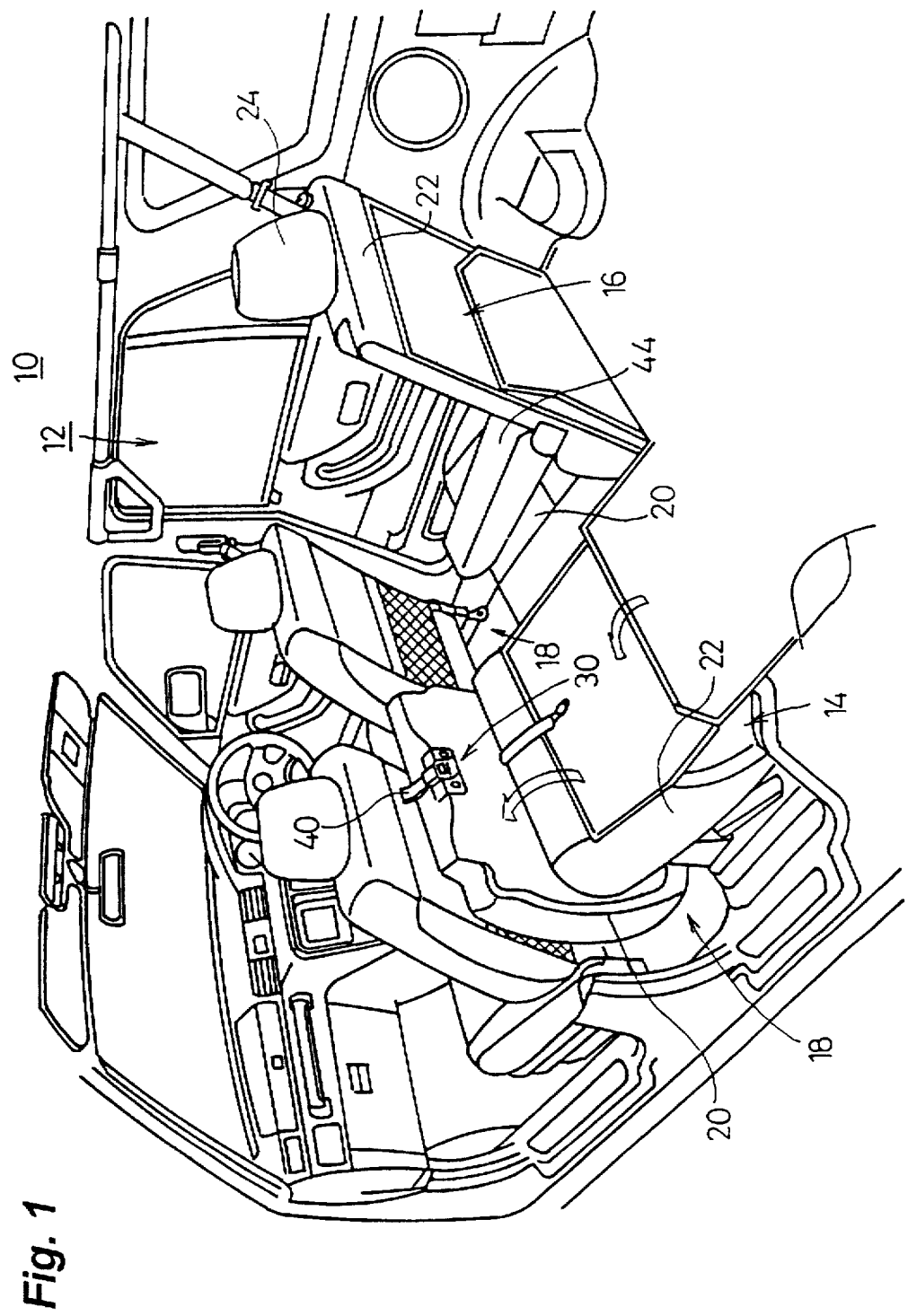
FIG. 1 is a perspective view of a passenger's compartment of a motor vehicle, as seen from the rear, which incorporates a headrest storage mechanism according to the present invention.

As shown in FIG. 1, a motor vehicle 10 has a passenger's compartment 12, which is viewed from the rear in FIG. 1, accommodating rear seats 14, 16 each combined with a headrest storage mechanism 18 according to the present invention. Since the rear seats 14, 16 are identical in structure to each other, only the rear seat 14 will be described below, and those parts of the rear seat 16 which are identical to those of the rear seat 14 are denoted by identical reference numerals and will not be described in detail below.

Figure 2:
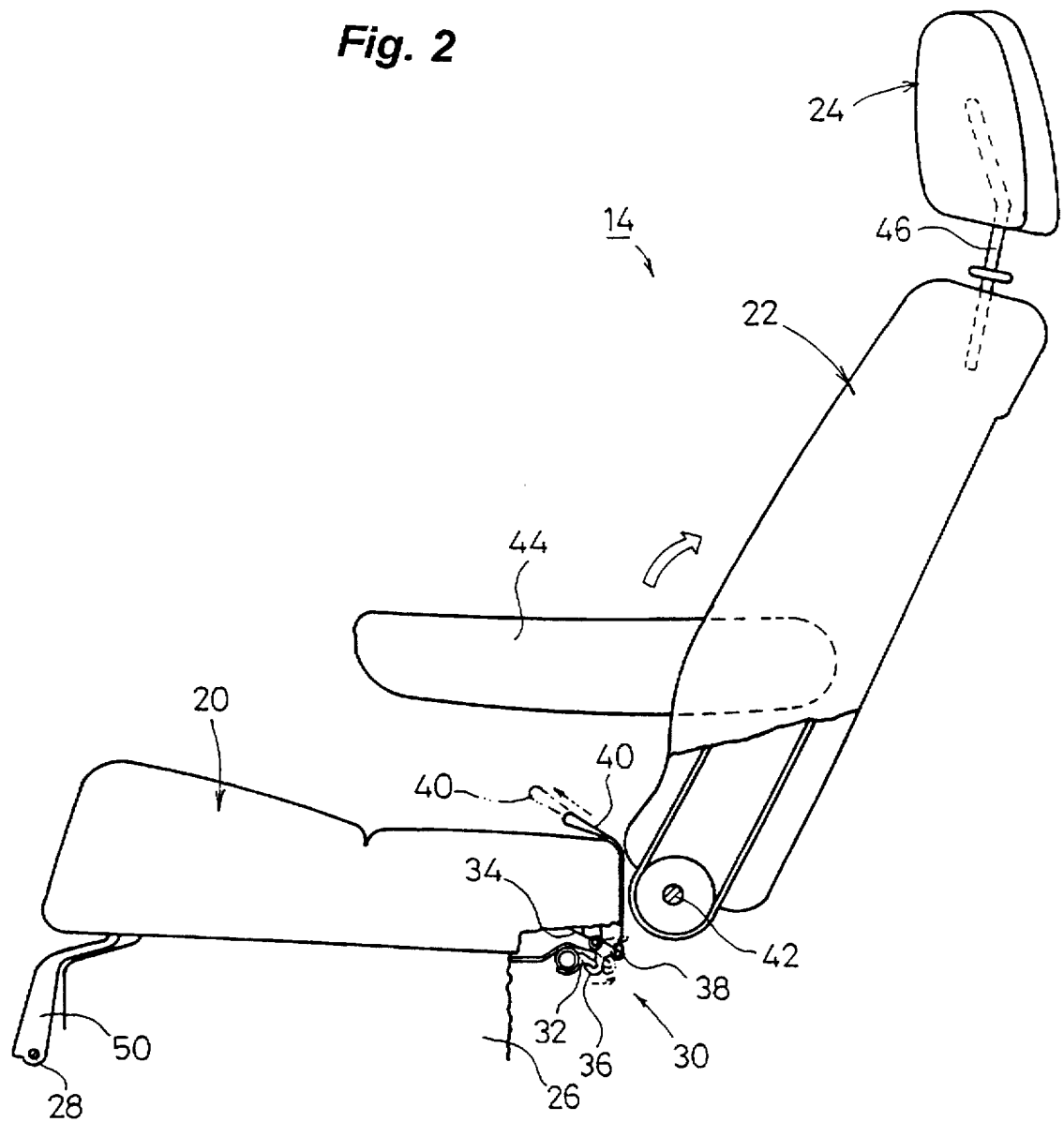
FIG. 2 is a side elevational view, partly broken away of a rear seat which is combined with the headrest storage mechanism.

As shown in FIG. 2, the rear seat 14 comprises a seat cushion 20, a backrest 22, and a headrest 24 detachably mounted on an upper edge of the backrest 22. The seat cushion 20 is placed on a cover 26 mounted on a motor vehicle body 10, and is pivotally attached to a front end of the cover 26 by a pivot 28 so that the seat cushion 20 can be lifted forward off the cover 26 about the pivot 28. A lock device 30 is mounted on a rear end of the cover 26 for locking the seat cushion 20 on the cover 26.

The lock device 30 comprises a lock member 32 mounted on the cover 26, a hook member 36 mounted on the seat cushion 20 and normally biased into engagement with the lock member 32 by a spring 34, and a tension string 40 wound on a projection 38 on the hook member 36 for being manually pulled upwardly to a position above the seat cushion 20.

The backrest 22 is angularly movably supported on the vehicle body 10 by a shaft 42 for backward reclining movement about the shaft 42 and forward lowering movement toward the seat cushion 20. An armrest 44 is liftably mounted on one side of the backrest 22. The headrest 24 has a pair of stays 46 extending substantially downwardly for insertion into an upper edge of the backrest 22 for securely fixing the headrest 24 to the upper edge of the backrest 22.

Figure 3:
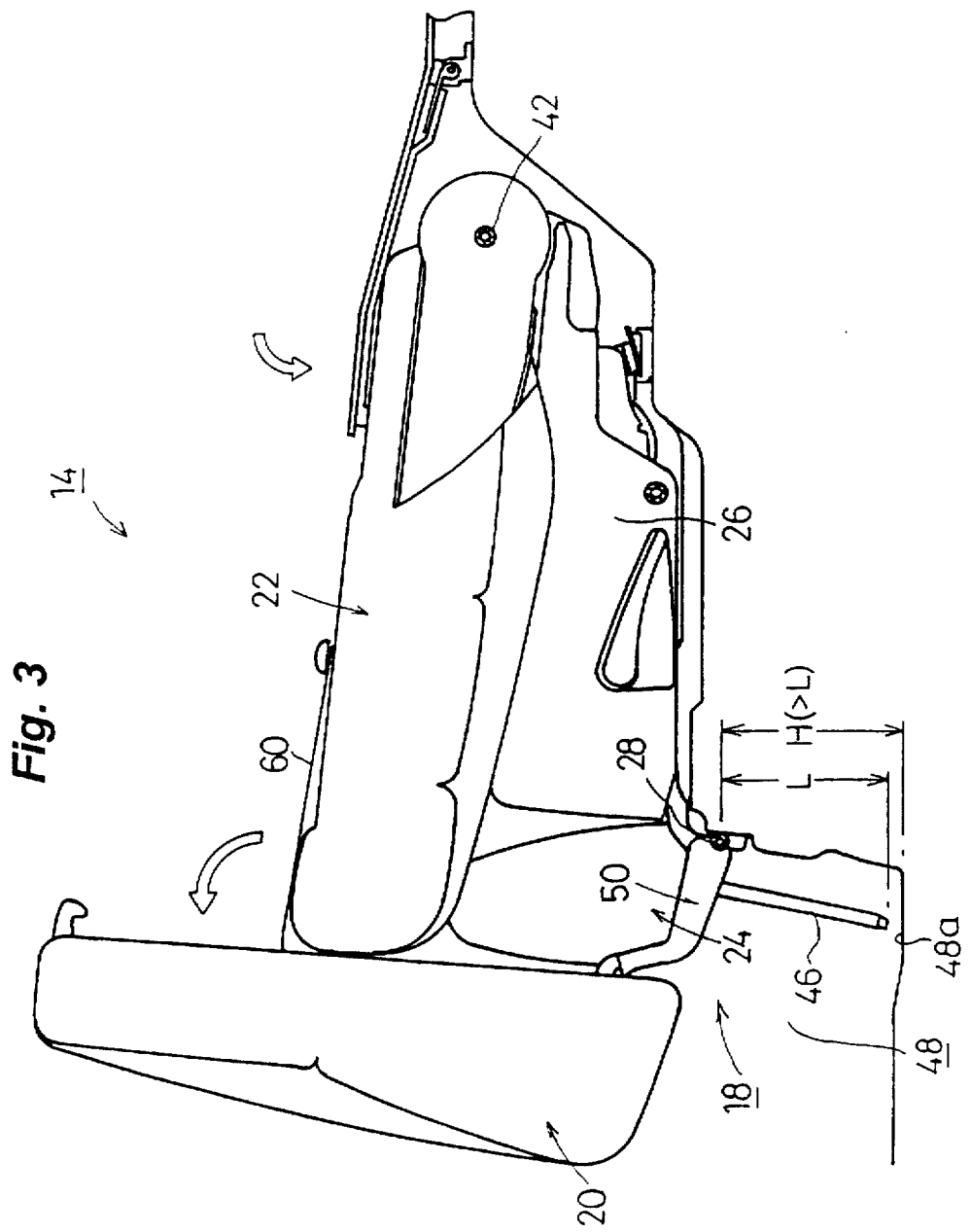
FIG. 3 is a side elevational view of the headrest storage mechanism.
Figure 4:
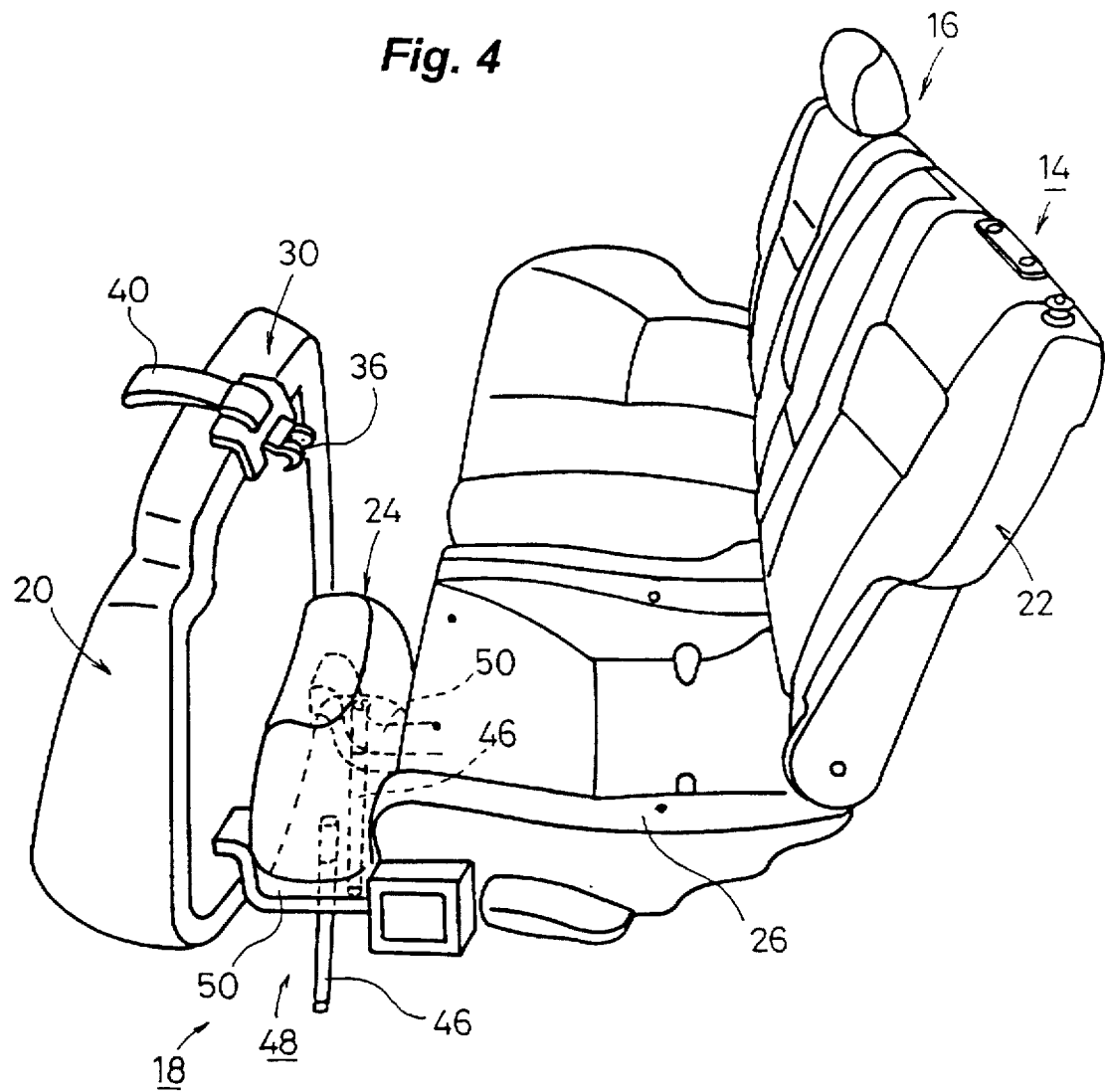
FIG. 4 is a perspective view of the rear seat with a seat cushion thereof being lifted forward.
Figure 5:
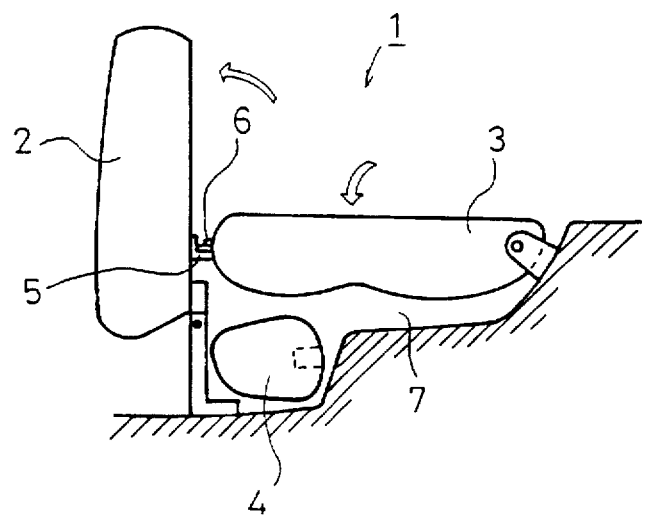
FIG. 5 is a side elevational view of a conventional motor vehicle seat.

As shown in FIG. 3, the headrest storage mechanism 18 comprises a headrest storage space 48 defined between the seat cushion 20 and the backrest 22 when the seat cushion 20 is lifted forward and the backrest 22 is lowered toward the seat cushion 20 with the headrest 24 removed from the backrest 22, and a pair of arms 50 (see also FIG. 4) extending from the seat cushion 20 and attached to the pivot 28 for supporting the headrest 24 in a desired attitude when the seat cushion 20 is kept in a forward lifted position.

The headrest storage space 48 is of such dimensions to be able to store therein the stays 46 extending downwardly from the headrest 24 when the headrest 24 is supported on the arms 50. Specifically, the distance H from the pivot 28 to the bottom of the headrest storage space 48 is greater than the length L from the pivot 28 to the lower ends of the stays 46 (H>L).

Operation of the headrest storage mechanism 18 will be described below.

When the string 40 is pulled upwardly in the direction indicated by the arrow in FIG. 2, the projection 38 engaging the string 40 causes the hook member 36 to swing in the direction indicated by the arrow against the bias of the spring 34. Therefore, the hook member 36 is disengaged from the lock member 32. The seat cushion 20 is now lifted forward about the pivot 28.

Then, the headrest 24 is detached from the backrest 22, and placed on the arms 50 and supported thereby in a desired attitude. The backrest 22 is lowered forward toward the seat cushion 20, with the rear surface of the backrest 22 being usable as a cargo base (see FIGS. 1 and 3).

According to the illustrated embodiment, when the seat cushion 20 is lifted forward about the pivot 28, the arms 50 attached to the pivot 28 are maintained in a supporting attitude. Therefore, when the headrest 24 is placed on the arms 50, the headrest 24 is supported on the arms 50 with the stays 46 extending substantially downwardly. The headrest 24 is thus reliably supported in the desired attitude rather than being simply placed in the headrest storage space 48. While the motor vehicle is running, the headrest 24 supported on the arms 50 is prevented from moving about in the headrest storage space 48, and hence from making noise and getting smeared with dirt. The headrest storage mechanism 18 is relatively simple in structure as it requires no dedicated support structure for supporting the headrest 24.

As shown in FIG. 3, the headrest 24 has its lower surface held by the arms 50 and an upper surface pressed down by the backrest 22. Consequently, the headrest 24 is firmly supported in the headrest storage space 48 against movement in the headrest storage space 48 while the motor vehicle is running.

A fastening belt 60 may be added which can be integrally fixed to the bottom surface of the seat cushion 20 which has been lifted forward and the rear surface of the backrest 22 which has been lowered forward.

As described above, the headrest storage mechanism according to the present invention has the headrest storage space defined between the seat cushion and the backrest, and the arms attached to the pivot of the seat cushion for supporting the headrest thereon. The headrest storage space has such dimensions as to be able to store the stays which extend downwardly from the headrest. The headrest is supported on the arms with the stays extending downwardly. The headrest can thus be reliably supported in a desired attitude in the headrest storage space against unwanted movement and hence does not make noise and get smeared with dirt.

Although a certain preferred embodiment of the present invention has been shown and described in detail, it should be understood that various changes and modifications may be made therein without departing from the scope of the appended claims.

What is claimed is:

1. A headrest storage mechanism for a motor vehicle seat, comprising:

a seat having a seat cushion angularly movable about a pivot, a backrest angularly movable about a shaft, and a headrest detachably mounted on said backrest, said headrest having a pair of unitary stays extending downwardly from said headrest;

a headrest storage space defined between said seat cushion and said backrest when the seat cushion is lifted forward and the backrest is lowered forward toward the seat cushion, with said headrest having said stays detached from said backrest;

a pair of supporting arms mounted on an underside of the seat cushion and attached to said pivot, said supporting arms extending across said headrest storage space for supporting the headrest in a given attitude when the seat cushion is lifted forward; and said headrest positioned in said headrest storage space, when said headrest and said pair of stays are detached from said backrest with said headrest supported on said pair of supporting arms and said pair of stays extending downwardly from said headrest past said pair of supporting arms toward a floor of a vehicle.

2. A headrest storage mechanism according to claim 1, wherein said headrest is held by said arms and pressed by said backrest when said headrest is supported on said arms.

3. A headrest storage mechanism according to claim 1, further comprising a vehicle body and a cover mounted on said vehicle body, said seat cushion being angularly movably mounted on said vehicle body for forward lifting movement off said cover.

4. A headrest storage mechanism according to claim 3, further comprising:

lock means mounted on said cover for locking a rear end of said seat cushion on said cover;

said lock means comprising:

a lock member mounted on said cover;

a hook member mounted on said seat cushion and normally biased into engagement with said lock member by a spring; and a tension string engaging said hook member for being pulled upwardly above the rear end of said seat cushion.

5. A headrest storage mechanism according to claim 1, wherein a top of said backrest is provided with a pair of sockets for detachably receiving said pair of unitary stays solely by slidably inserting and withdrawing said stays into and from, respectively, said sockets.

6. A headrest storage mechanism according to claim 1, wherein said pair of stays are positioned between said pair of supporting arms when said headrest and said pair of stays are supported in said headrest storage space.

7. A headrest storage mechanism according to claim 1, wherein said pair of stays are of a length that is less than a distance from a top of said pair of supporting arms to said vehicle floor whereby said pair of stays do not engage said vehicle floor when said headrest and said pair of stays are supported in said headrest storage space.

* * * * *